US007745385B2

(12) United States Patent
Brooker

(10) Patent No.: US 7,745,385 B2
(45) Date of Patent: Jun. 29, 2010

(54) WATER-SOLUBLE POUCH COMPRISING A DETERGENT COMPOSITION

(75) Inventor: Alan Thomas Brooker, Newcastle (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/413,668

(22) Filed: Mar. 30, 2009

(65) Prior Publication Data

US 2009/0253604 A1 Oct. 8, 2009

(30) Foreign Application Priority Data

Apr. 2, 2008 (EP) ................................. 08006719

(51) Int. Cl.
*C11D 17/04* (2006.01)
*C11D 3/40* (2006.01)
*C11D 1/72* (2006.01)
*C09B 67/24* (2006.01)

(52) U.S. Cl. ....................... 510/296; 510/305; 510/356; 510/439; 510/509; 8/549; 8/641

(58) Field of Classification Search ................. 510/296, 510/305, 356, 439, 509; 8/549, 641
See application file for complete search history.

(56) References Cited

U.S. PATENT DOCUMENTS

| | | | | |
|---|---|---|---|---|
| 5,145,484 | A * | 9/1992 | Lacroix et al. | 8/524 |
| 6,126,700 | A * | 10/2000 | Bao-Kun et al. | 8/549 |
| 6,171,349 | B1 * | 1/2001 | Lai et al. | 8/549 |
| 6,274,538 | B1 * | 8/2001 | Addison | 510/224 |
| 7,469,519 | B2 * | 12/2008 | Barthel et al. | 53/433 |
| 2002/0108184 | A1 * | 8/2002 | Pettifer et al. | 8/115.51 |
| 2006/0287211 | A1 * | 12/2006 | Barbizan et al. | 510/367 |
| 2008/0234169 | A1 * | 9/2008 | Boutique et al. | 510/343 |
| 2009/0088363 | A1 | 4/2009 | Panandiker et al. | |

FOREIGN PATENT DOCUMENTS

| | | | |
|---|---|---|---|
| EP | 1201744 | A1 | 5/2002 |
| EP | 1256623 | A1 | 11/2002 |

OTHER PUBLICATIONS

PCT International Search Report dated Jun. 29, 2009—5 pgs.

* cited by examiner

*Primary Examiner*—Lorna M Douyon
(74) *Attorney, Agent, or Firm*—Julie A. McConihay; David V. Upite; Leonard W. Lewis

(57) ABSTRACT

The present invention relates to a water-soluble pouch comprising a laundry detergent composition comprising reactive dye.

13 Claims, 1 Drawing Sheet

WATER-SOLUBLE POUCH COMPRISING A DETERGENT COMPOSITION

FIELD OF THE INVENTION

The present invention relates to a water-soluble pouch that comprises a laundry detergent composition that is capable of dyeing fabric and cleaning fabric during a laundering process. The laundry detergent composition comprises reactive dye.

BACKGROUND OF THE INVENTION

Laundry detergent manufacturers have attempted to meet the consumer need to rejuvenate coloured fabrics and provide good fabric-cleaning performance during the laundering process. Current fabric treatment compositions that comprise fabric-substantive dyes do not adequately clean the fabric during the laundering process, and the consumer still needs to use additional conventional laundry detergent compositions (i.e. that do not comprise fabric-substantive dyes) in order to adequately clean the fabric. However, this combination is costly and not efficient as two separate laundering processes need to be undertaken. Furthermore, previous attempts by the detergent manufacturers to provide a detergent composition that provides a good colour-rejuvenation profile have focused on dyes that are used to dye fabrics during textile mill processes, and to incorporate these dyes into laundry detergent compositions. However, these dyes are not as fabric substantive during the laundering process when relatively low temperatures (from 5° C. to 60° C.) typical of domestic laundering processes are used compared to the textile mill process when relatively higher temperatures (90° C. to 95° C.) typical of textile mill processing conditions are used. Simply incorporating these dyes into conventional laundry detergent compositions leads to inefficient colour rejuvenation profile.

Furthermore, over multiple wash cycles, the colour of fabrics laundered with conventional laundry detergent compositions deteriorates to an undesirable degree. There continues to be a need to provide a laundry detergent composition that provides good colour care, colour rejuvenation and a good cleaning performance.

The Inventors have found that the handling of detergent products comprising reactive dyes can be difficult, with unwanted transfer of reactive dye from the product to various surfaces that the consumer does not want to become coloured. In addition, the Inventors have found that it is difficult to incorporate some liquid ingredients, such as liquid non-ionic detersive surfactant, into the composition that comprises a reactive dye, and still achieve good cleaning and dye rejuvenation performance.

SUMMARY OF THE INVENTION

The present invention overcomes the above problems by providing a water-soluble pouch comprising a laundry detergent composition, said pouch having a first compartment containing a nonionic surfactant and a second compartment containing a mixture of three types of dyes, as disclosed hereinafter.

DETAILED DESCRIPTION OF THE INVENTION

Water-Soluble Pouch

Figure 1:
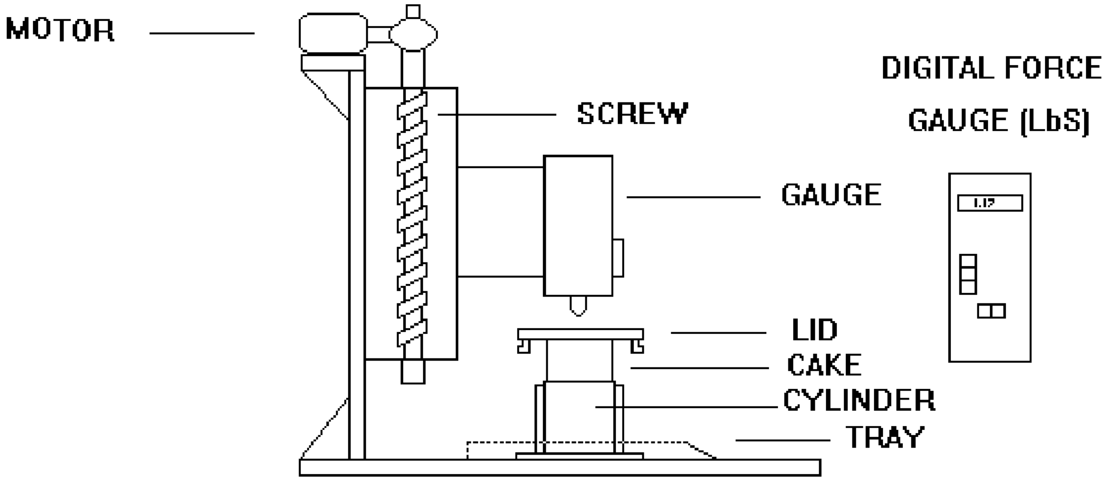
FIG. 1 shows the equipment used to measure cake strength according to the PROCEDURE disclosed herein.

The water-soluble pouch comprises a solid laundry detergent composition. The solid detergent composition is described in more detail below. Preferably, the pouch comprises at least two compartments, and may even comprise three or more, or even four or more compartments. Preferably, the first compartment comprises non-ionic detersive surfactant and optionally liquid components. Preferably, the non-ionic detersive surfactant present in the first compartment is in liquid form. Other liquid components that may also be present in the first compartment include perfumes. Preferably, the second compartment comprises reactive dye and optionally solid components. Suitable solid components include sodium carbonate.

The pouch may comprise a plurality of compartments, typically in generally superposed or superposable relationship, for example, the plurality of compartments can be symmetrically arranged one above another, side by side (such that they can be folded into a superposed relationship) or any other convenient disposition provided that the compartments are superposable in use. Each compartment may contain one or more detergent active components or detergent auxiliaries. Water-soluble pouches comprising a plurality of compartments are herein referred to as multi-compartment pouches. Multi-compartment pouches in which the compartments are in a superposed relationship are especially advantageous when one or more of the compartments comprise a moisture sensitive ingredient, because the compartment comprising a moisture sensitive ingredient can be placed in intermediate or bottom layers and thus they have less surface area exposed to the surrounding environment, therefore reducing the possibility of picking up moisture from the surroundings.

The pouch preferably has a volume of from about 5 to about 70 ml, preferably from about 15 to about 60 ml, more preferably from about 18 to 57 ml, and a longitudinal/transverse aspect ratio in the range from about 2:1 to about 1:8, preferably from about 1:1 to about 1:4. The longitudinal dimension is defined as the maximum height of the pouch when the pouch is lying on one of the bases which has the maximum footprint with the pouch compartments superposed in a longitudinal direction, i.e. one over another, and under a static load of about 2 Kg. The transverse dimension is defined as the maximum width of the pouch in a plane perpendicular to the longitudinal direction under the same conditions. These dimensions are adequate to fit the dispensers of the majority of dishwashers. Although the shape of the pouch can vary widely, in order to maximize the available volume, preferred pouches have a base as similar as possible to the footprint of the majority of the dispensers, that is generally rectangular.

In one embodiment the plurality of compartments of the water-soluble pouch are in generally superposed relationship and the pouch comprises upper and lower generally opposing outer walls, a skirt-like side walls, forming the sides of the pouch, and one or more internal partitioning walls, separating different compartments from one another, and wherein each of said upper and lower outer walls and skirt-like side wall are formed by thermoforming, vacuum forming or a combination thereof.

In a preferred embodiment each internal partitioning wall of the water-soluble multi-compartment pouch is secured to an outer or side wall of the pouch along a single seal line or to both an outer and a side wall of the pouch along a plurality of seal lines that are at least partially non-overlapping. Preferably each partitioning wall is secured to one or more outer or sides wall by heat or solvent sealing.

In especially preferred embodiments at least one internal partitioning wall of the multi-compartment pouch is secured to an upper or lower outer wall along a first continuous seal line and one or both of said outer wall and said partitioning wall are secured to the skirt-like side wall along a second continuous seal line and wherein the seal lines in the case of heat seals are essentially non-overlapping and in the case of solvent seals are at least partially non-overlapping.

Non-overlapping seal lines are particularly advantageous in the case of multi-compartment pouches made by a process involving several non-simultaneous heat sealing steps. Without wishing to be bound by theory, it is believed that the heat seal mechanism involves the step of water evaporation from the film, therefore it is very difficult to achieve a good overlapping seal unless the two seals are formed simultaneously. Heat sealing is preferred in cases in which the pouches are filled with water sensitive components. Solvent sealing can reduce processing cost, can produce stronger seals and can make the process faster. Partially non-overlapping seals allow for the superposition of a plurality of compartments of different sizes.

Preferably, at least one internal partitioning wall of the multi-compartment pouch is secured to the upper outer wall along a first seal line defining the waist line of the skirt-like wall and wherein the second non-overlapping or at least partially non-overlapping seal is preferably off-set below the waist line-defining seal line in the direction of the lower outer wall. The skirt-like side wall is also preferably slightly gathered or puckered in the final pouch to provide a mattress-like appearance.

In another embodiment the water-soluble pouch comprises a plurality of compartments in side-by-side but generally superposable relationship (for example, the compartments can be folded over each other). The pouch comprises upper and lower generally opposing outer walls, one or more skirt-like side walls and one or more external partitioning walls, and wherein each of said upper and lower outer walls and skirt-like side walls are formed by thermoforming, vacuum forming or a combination thereof.

In one embodiment at least one of the plurality of compartments of the water-soluble pouch comprises a powder or densified powder composition. The powder composition usually comprises traditional solid materials used in detergents, such as builders, alkalinity sources, enzymes, etc. The powder composition can be in the form of dry powder, hydrated powder, agglomerates, encapsulated materials, extrudates, tablets or mixtures thereof. It is also useful to have water-soluble pouches with several compartments comprising different powder compositions, usually compositions in different compartments comprise incompatible actives or actives which need to be delivered at different times of the dishwashing process.

In the case of powder compositions differential dissolution can be obtained, for example, by varying the degree of powder compression and/or particle size of the powder compositions in the same or different compartments. Another way to obtain differential dissolution is to use water-soluble films of different thickness or different degree or rate of solubility under in-use conditions. Film solubility can be controlled by for example pH, temperature, ionic strength or any other means. For purposes of achieving phased or sequential delivery of detergent actives, it is preferred that each of the compartments of the pouch have a different disintegration rate or dissolution profile under in-use conditions.

In another embodiment at least one of the plurality of compartments of the water-soluble pouch comprises a liquid composition. The liquid compositions comprise traditional liquid materials used in detergents, such as organic solvents. Especially useful are water-soluble pouches having one compartment comprising a liquid composition and another compartment comprising a solid composition. In the case of liquid compositions, especially liquid compositions enclosed within a secondary pack, it is desirable to have a water content in the composition similar to the water content in the film in order to avoid transfer of water from one to another. In cases in which the content of water is lower in the composition than in the film, water can migrate from the film to the composition making the water-soluble pouch brittle. For similar reasons, it is also desirable to have a similar amount of plasticiser in the composition and in the film.

In another embodiment at least one of the plurality of compartments of the water-soluble pouch comprises a composition in the form of a paste. The multi-compartment pouches can also include compositions in the form of a gel or a wax.

In preferred embodiments at least one of the plurality of compositions of the water-soluble pouch comprises an organic solvent system compatible with the water-soluble pouch. The organic solvent system can simply act as a liquid carrier, but in preferred compositions, the solvent can aid removal of cooked-, baked- or burnt-on soil and thus has detergent functionality in its own right. The organic solvent system (comprising a single solvent compound or a mixture of solvent compounds) preferably has a volatile organic content above 1 mm Hg and more preferably above 0.1 mm Hg of less than about 50%, preferably less than about 20% and more preferably less than about 10% by weight of the solvent system. Herein volatile organic content of the solvent system is defined as the content of organic components in the solvent system having a vapor pressure higher than the prescribed limit at 25° C. and atmospheric pressure.

The organic solvent system for use herein is preferably selected from organoamine solvents, inclusive of alkanolamines, alkylamines, alkyleneamines and mixtures thereof; alcoholic solvents inclusive of aromatic, aliphatic (preferably $C_4$-$C_{10}$) and cycloaliphatic alcohols and mixtures thereof; glycols and glycol derivatives inclusive of $C_2$-$C_3$ (poly)alkylene glycols, glycol ethers, glycol esters and mixtures thereof; and mixtures selected from organoamine solvents, alcoholic solvents, glycols and glycol derivatives. In one preferred embodiment the organic solvent comprises organoamine (especially alkanolamine) solvent and glycol ether solvent, preferably in a weight ratio of from about 3:1 to about 1:3, and wherein the glycol ether solvent is selected from ethylene glycol monobutyl ether, diethylene glycol monobutyl ether, ethylene glycol monomethyl ether, ethylene glycol monoethyl ether, diethylene glycol monomethyl ether, diethylene glycol monoethyl ether, propylene glycol monobutyl ether, and mixtures thereof. Preferably, the glycol ether is a mixture of diethylene glycol monobutyl ether and propylene glycol butyl ether, especially in a weight ratio of from about 1:2 to about 2:1.

The pouch is preferably made of a film material which is soluble or dispersible in water, and has a water-solubility of at least 50%, preferably at least 75% or even at least 95%, as measured by the method set out here after using a glass-filter with a maximum pore size of 20 microns.

Water-solubility is typically measured by the following protocol: 50 grams±0.1 gram of film material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the % solubility or dispersability can be calculated.

Preferred film materials are polymeric materials, preferably polymers which are formed into a film or sheet. The film material can, for example, be obtained by casting, blow-moulding, extrusion or blown extrusion of the polymeric material, as known in the art.

Preferred polymers, copolymers or derivatives thereof suitable for use as film material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the film material, for example a PVA polymer, is at least 60%.

The polymer can have any weight average molecular weight, preferably from about 1000 Da to 1,000,000 Da, more preferably from about 10,000 Da to 300,000 Da yet more preferably from about 20,000 Da to 150,000 Da.

Mixtures of polymers can also be used as the film material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000.

Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

Preferred for use herein are polymers which are from about 60% to about 98% hydrolysed, preferably about 80% to about 90% hydrolysed, to improve the dissolution characteristics of the material.

Most preferred film materials are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Laundry Detergent Composition.

The laundry detergent composition comprises a reactive dye. Preferably, the composition comprises a non-ionic detersive surfactant. The non-ionic detersive surfactant and reactive dye is discussed in more detail below.

Upon contact with water the composition typically has an equilibrium pH of 10.5 or greater at a concentration of 4 g/l in de-ionized water and at a temperature of 20° C. The pH profile of the composition is discussed in more detail below.

Preferably, the composition comprises an alkalinity source. The alkalinity source is discussed in more detail below.

Preferably, the composition comprises less than 5 wt %, or less than 4 wt %, or less than 3 wt %, or less than 2 wt %, or less than 1 wt % anionic detersive surfactant. Preferably, the composition is essentially free of anionic detersive surfactant. By "essentially free of" it is typically meant "no deliberately added". Reducing the level of, and even removing, the anionic detersive surfactant improves the colour-rejuvenation profile of the composition.

Preferably, the composition comprises less than 5 wt %, or less than 4 wt %, or less than 3 wt %, or less than 2 wt %, or less than 1 wt % sodium sulphate. Preferably, the composition is essentially free of sodium sulphate. By "essentially free of" it is typically meant "no deliberately added". Reducing the level of, and even removing, sodium sulphate chemically compacts the composition; and thus improving its transport efficiency, improving its shelf-storage efficiency, and further improving its environmental profile.

Preferably, the composition comprises less than 5 wt %, or less than 4 wt %, or less than 3 wt %, or less than 2 wt %, or less than 1 wt % bleach. Preferably, the composition is essentially free of bleach. By "essentially free of" it is typically meant "no deliberately added". Reducing, and even removing, bleach improves the colour rejuvenation profile of the composition.

Preferably, the composition comprises less than 10 wt %, or less than 5 wt %, or less than 4 wt %, or less than 3 wt %, or less than 2 wt %, or less than 1 wt % phosphate builder. Preferably, the composition is essentially free of phosphate builder. By "essentially free of" it is typically meant "no deliberately added". Reducing, and even removing, phosphate builder further improves the environmental profile of the composition.

Preferably, the composition comprises less than 10 wt %, or less than 5 wt %, or less than 4 wt %, or less than 3 wt %, or less than 2 wt %, or less than 1 wt % zeolite builder. Preferably, the composition is essentially free of zeolite builder. By "essentially free of" it is typically meant "no deliberately added". Reducing, and even removing, zeolite builder from the composition improves its dissolution profile.

Preferably, the composition comprises less than 10 wt %, or less than 5 wt %, or less than 4 wt %, or less than 3 wt %, or less than 2 wt %, or less than 1 wt % sodium silicate. Preferably, the composition is essentially free of sodium silicate. By "essentially free of" it is typically meant "no deliberately added". Reducing, and even removing, sodium silicate from the composition improves its dissolution profile.

Preferably, the composition comprises an enzyme system. The enzyme system is described in more detail below.

The composition can be in solid form, or liquid form, or preferably part of the composition is in liquid, or gel, form, and part of the composition is in solid form.

Detersive Surfactant

The composition preferably comprises a non-ionic detersive surfactant. In addition to the non-ionic detersive surfactant, other detersive surfactants may also be suitable, such as anionic detersive surfactant, cationic detersive surfactant, zwitterionic surfactant, or any mixture thereof. However, as discussed in more detail above, preferably the composition comprises a low level of, or is even essentially free of, anionic detersive surfactant.

The composition comprises non-ionic detersive surfactant. This is especially preferred when the composition comprises low levels of, or is essentially free of, anionic detersive surfactant. Preferably, the non-ionic detersive surfactant comprises a $C_8$-$C_{24}$ alkyl alkoxylated alcohol having an average degree of alkoxylation of from 1 to 20, preferably a $C_{10}$-$C_{18}$ alkyl alkoxylated alcohol having an average degree of alkoxylation of from 1 to 10, or even a $C_{12}$-$C_{18}$ alkyl alkoxylated alcohol having an average degree of alkoxylation of from 1 to 7. Preferably, the non-ionic detersive surfactant is an ethoxylated alcohol. The non-ionic detersive surfactant may even be a predominantly $C_{16}$ alkyl ethoxylated alcohol having an average degree of ethoxylation of from 3 to 7. The non-ionic surfactant may comprise an alkyl polyglucoside.

Preferably, the non-ionic detersive surfactant is in liquid form. However, the non-ionic detersive surfactant may be in particulate form, and preferably wherein the particle has a cake strength of from 0 kg to 1.5 kg. The method to determine cake strength is described in more detail below.

Method to Determine the Cake Strength

The cake strength is typically determined by the following method:

Apparatus

Cake Former

This cake formation apparatus is designed to produce a cylindrical cake of 6.35 cm in diameter and 5.75 cm in height.

| | |
|---|---|
| CYLINDER | Solid perspex, with polished surface.<br>Diameter 6.35 cm<br>Length 15.90 cm<br>Base plate on end, diameter 11.40 cm, depth 0.65 cm<br>0.65 cm hole through the cylinder, with its centre 9.2 cm from the end opposite the base plate |
| SLEEVE | Hollow perspex, with polished inner surface<br>Inner diameter 6.35 cm<br>Wall thickness 1.50 cm<br>Length 15.25 cm |
| LID | Perspex disc<br>Diameter 11.5 cm<br>Thickness 0.65 cm |
| LOCKING PIN | Stainless steel<br>Diameter 0.6 cm<br>Length 10 cm |
| WEIGHTS | 5 Kg to fit size of lid<br>10 kg, to fit size of lid |

Force Recorder

| | |
|---|---|
| FORCE GAUGE | Either manual or electronic: battery/mains operated<br>Max capacity 25 kg<br>Graduations 0.01 kg |
| MOTORISED | Solid stand |
| STAND | Force gauge mounted on a block which moves in a vertical direction on a screw, driven by a reversible motor<br>Rate of gauge descent = 54 cm/min |
| POWDER TRAY | For collection of powder from broken cake |
| STEEL RULE | For smoothing top of cake |

Equipment Set-Up

See Attached Drawing

Conditioning: powder samples are stored at 35° C. for 24 hrs before testing. Test equipment is also at 35° C.

Procedure

Step by Step Procedure

1> Place cake formation cylinder on a flat surface

2> Place the locking pin in the hole.

3> Slip on the cake formation sleeve and check that it moves freely

4> Pour in representative test material sample until the material overflows the cylinder sides 5> Level off granules with one smooth action using a steel rule or equivalent straight edge.

6> Place top plate on cylinder and centre by eye.

7> Place weight on top of assembly

8> Carefully, gently remove the restraining rod and start timer

9> Whilst cake is being formed move force meter to top position and zero it.

10> After two minutes, remove weight

11> Slide down cylinder so cake is completely exposed (leaving top plate remaining).

12> Gently place cake formation assembly under force meter

13> Centre assembly under force gauge by eye.

14> Start force meter apparatus so that it descends and breaks cake.

15> Read the maximum force (in Kgs) required to break the cake from the force meter dial.

16> Repeat least three times for each material and average the forces, this average is the mean cake strength for the material tested.

Reactive Dye.

The composition comprises a reactive dye. Preferably, the dye is a reactive azo dye. Preferably, the composition comprises a black and/or blue reactive dye, although other reactive dyes such as red, orange and/or yellow reactive azo dyes may also be present.

The reactive dye preferably has the structural formula:

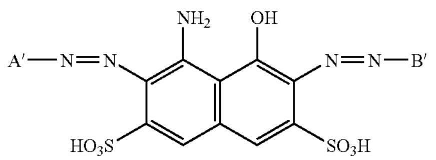

wherein A' and B' are each independent selected from an aromatic group which is unsubstituted or substituted by halogen, $C_1$-$C_4$ alkyl, $C_1$-$C_4$ alkoxyl, sulphonyl, or amino groups. Preferably, the reactive dye has the structural formula:

(II)

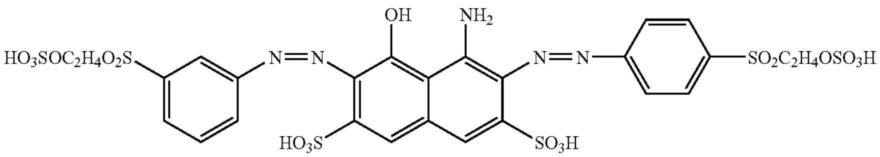

Suitable reactive dyes are described in more detail in U.S. Pat. No. 6,126,700.

Typically, the reactive dye comprises an anionic moiety, such as a sulphonyl moiety bound to the substituted naphthalene. However, for convenience, the above formulae show the reactive dye in their free acid form. Furthermore, the reactive dye is typically in the form of a salt, especially an alkali metal salt, such as sodium salt or potassium salt, or the salt can be in the form of an ammonium salt.

The reactive dye preferably comprises: (a) a black reactive dye having the above formula II; and (b) at least one other black or blue reactive dye having the above formula I, and preferably (c) at least one other red, orange and/or yellow reactive azo dye. The above described reactive dye that comprises components (a), (b) and (c) has an excellent dye build-up profile on the fabric during the laundering process. Preferably, the black reactive dye (component (a)) is the major component of the reactive dye.

Preferably the black or blue reactive dye of component (b) is a compound having one of the following formulae:

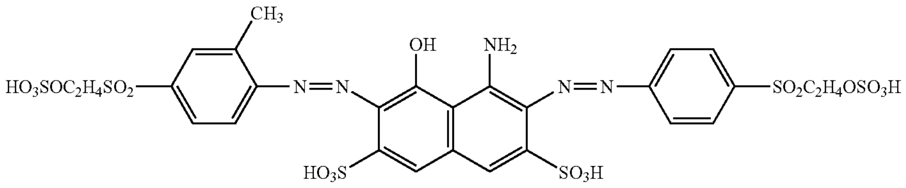

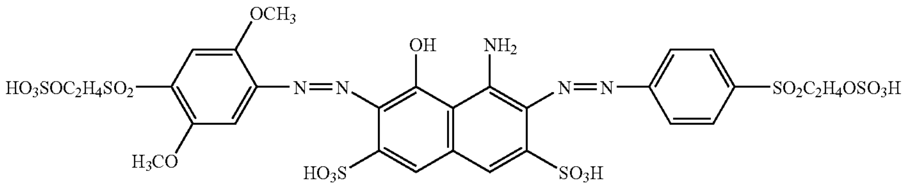

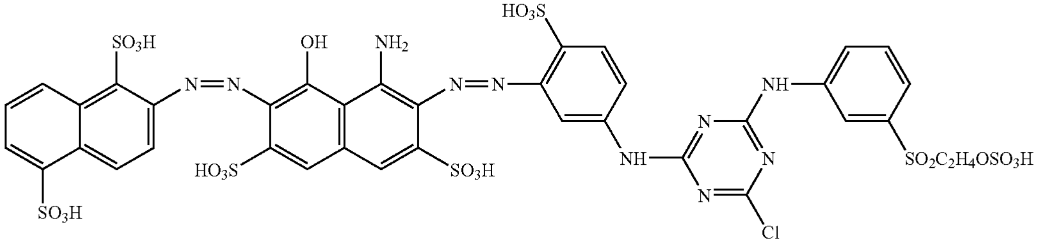

There is no special limitation on the red, orange, or yellow reactive azo dye of component (c). Any red, orange and/or yellow azo dyes can be used. More specific examples of component (c) are:

(III-1)

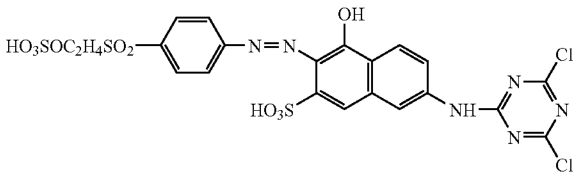

(III-2)

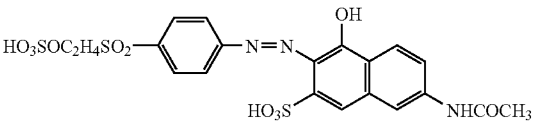

(III-3)

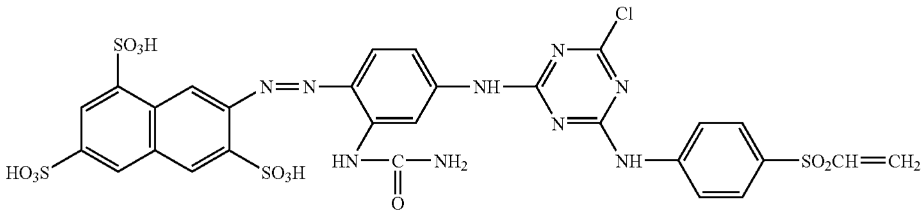

-continued (III-4)

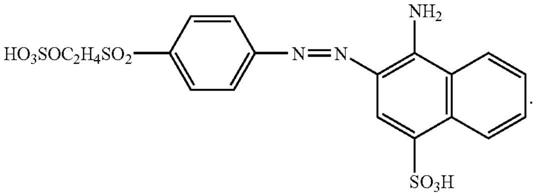

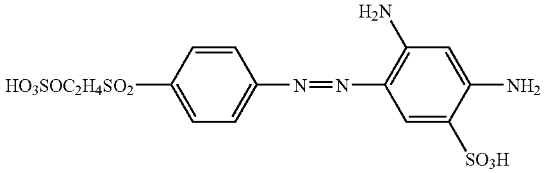

The weight ratio of the dye components (a), (b) and (c) may vary. However, typically, the reactive dye comprises at least 3 wt % component (a), at least 3 wt % component (b) and at least 3 wt % component (c). Preferably, the reactive dye comprises from 3 wt % to 90 wt % component (a). Examples of suitable reactive dyes are described in detail below. Formula is given in parenthesis, the number is the wt % of the component in the reactive dye.

| Example | Component (a) (%) | Component (b) (%) | Component (c) (%) | Component (c) (%) |
|---|---|---|---|---|
| 1 | (II) 58 | (I-1) 20 | (III-2) 15 | (III-3) 7 |
| 2 | (II) 29 | (I-1) 61 | (III-1) 7 | (III-3) 3 |
| 3 | (II) 59 | (I-1) 21 | (III-2) 20 | 0 |
| 4 | (II) 28 | (I-1) 62 | (III-2) 10 | 0 |
| 5 | (II) 55 | (I-1) 16 | (III-4) 17 | (III-5) 12 |
| 6 | (II) 31 | (I-1) 52 | (III-4) 10 | (III-5) 7 |
| 7 | (II) 57 | (I-2) 22 | (III-1) 14 | (III-3) 7 |
| 8 | (II) 27 | (I-2) 63 | (III-1) 7 | (III-3) 3 |
| 9 | (II) 58 | (I-2) 23 | (III-2) 19 | 0 |
| 10 | (II) 27 | (I-2) 64 | (III-2) 9 | 0 |
| 11 | (II) 54 | (I-2) 17 | (III-4) 17 | (III-5) 12 |
| 12 | (II) 29 | (I-2) 55 | (III-4) 9 | (III-5) 7 |
| 13 | (II) 56 | (I-3) 23 | (III-1) 14 | (III-3) 7 |
| 14 | (II) 26 | (I-3) 64 | (III-1) 7 | (III-3) 3 |
| 15 | (II) 57 | (I-3) 24 | (III-2) 19 | 0 |
| 16 | (II) 26 | (I-3) 65 | (III-2) 9 | 0 |
| 17 | (II) 54 | (I-3) 17 | (III-4) 17 | (III-5) 12 |
| 18 | (II) 29 | (I-3) 56 | (III-4) 9 | (III-5) 6 |
| 19 | (II) 89 | (I-1) 11 | 0 | 0 |
| 20 | (II) 42 | (I-1) 58 | 0 | 0 |
| 21 | (II) 81 | (I-2) 19 | 0 | 0 |
| 22 | (II) 40 | (I-2) 60 | 0 | 0 |
| 23 | (II) 80 | (I-3) 20 | 0 | 0 |
| 24 | (II) 39 | (I-3) 61 | 0 | 0 |

pH.

Upon contact with water the composition typically has an equilibrium pH of 10.5 or greater at a concentration of 4 g/l in de-ionized water and at a temperature of 20° C. Preferably, upon contact with water the composition has an equilibrium pH in the range of from 10.5 to 12.0 at a concentration of 4 g/l in de-ionized water and at a temperature of 20° C. Preferably, upon contact with water the composition has an equilibrium pH of 11.0 or greater at a concentration of 4 g/l in de-ionized water and at a temperature of 20° C.

Without wishing to be bound by theory, it is believed that the high pH improves the strength of the dye-fabric interaction, improves the fabric-substantivity of reactive dye and improves the colour rejuvenation profile of the solid laundry detergent composition.

The method of determining the pH profile of the composition is described in more detail below.

Method for Determining the pH Profile.

Dose 2.00 g of composition into a glass beaker and add 150 ml of de-ionised water at 20° C. Stir using a magnetic stirrer. Transfer the mixture from the beaker into a volumetric flask and make up to 500 ml with de-ionised water at 20° C. Mix well. Calibrate a pH meter using pH 7 and pH 10 buffers. Measure the pH of the solution using the calibrated pH meter.

Alkalinity Source.

The composition preferably comprises a source of alkalinity. Preferably, the alkalinity source is selected from the group consisting of: silicate salt, such as sodium silicate, including sodium meta-silicate; source of carbonate such as sodium carbonate and potassium carbonate; source of hydroxide, such as potassium hydroxide and sodium hydroxide; and mixtures thereof.

Source of Carbonate

Preferably, the composition comprises a source of carbonate. Preferably, the composition comprises a source of carbonate in an amount of 10 wt % or greater. Preferably, the composition comprises from 30 wt % to 70 wt % sodium carbonate.

Enzyme System

Preferably, the composition comprises an enzyme system. Preferably, the enzyme system has protolytic activity, amylolytic activity and cellulolytic activity. Preferably, the composition comprises from 3 to 25 APU activity of protease, from 10 to 50 KNU activity of amylase and from 750 CEVU to 1,500 CEVU activity of cellulase.

Method of Manufacture

The composition of the present invention can be made by agglomeration, spray drying, or an extrusion process.

EXAMPLES

Examples 25-27

The following example compositions are solid free flowing granular laundry detergent compositions that are enclosed by a film material comprising polyvinyl alcohol to form a water-soluble pouch according to the present invention.

| Ingredient | 25 (wt %) | 26 (wt %) | 27 (wt %) |
|---|---|---|---|
| Sodium carbonate | 66 | 66 | 80 |
| $C_8$-$C_{18}$ alkyl ethoxylated alcohol having an average degree of ethoxylation of 7 | 1.1 | 1.1 | 1 |
| Alkyl polyglucoside | 10 | 10 | 9 |
| Quaternary ammonium cationic detersive surfactant | 1.1 | 1.1 | 1.4 |
| A compound having the following general structure: bis(($C_2H_5O$)($C_2H_4O$)*n*)($CH_3$)—$N^+$—$C_xH_{2x}$—$N^+$—($CH_3$)-bis(($C_2H_5O$)($C_2H_4O$)*n*), wherein n = from 20 to 30, and x = from 3 to 8, or sulphated or sulphonated variants thereof | 1.7 | 1.7 | 1.2 |
| 1-hydroxy ethane-1,1-diphosphonic acid (HEDP) | 0.4 | 0.4 | 0.8 |
| Silicone suds suppressor | 0.08 | 0.08 | 0.08 |
| Protease | 0.2 | | 0.2 |
| Amylase | 0.5 | | 0.3 |
| Mannanase | 0.3 | | 0.3 |
| Cellulase | 0.6 | | 0.3 |
| Reactive dye of examples 1-24 | 1.1 | 1.1 | 0.6 |
| Miscellaneous and moisture | to 100 wt % | to 100 wt % | to 100 wt % |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble pouch comprising a laundry detergent composition that is essentially free from anionic surfactant and comprising a reactive azo dye component, said pouch comprising:

i.) a first compartment comprising a liquid composition containing a nonionic surfactant that is a $C_{10}$-$C_{18}$ alkyl alkoxylated alcohol having an average degree of ethoxylation of from 1 to 10; and ii.) a second compartment comprising a solid composition comprising said dye component in an amount effective for dyeing fabric or color rejuvenation; and wherein said dye component is a mixture of a first dye (a) having the formula:

(a)

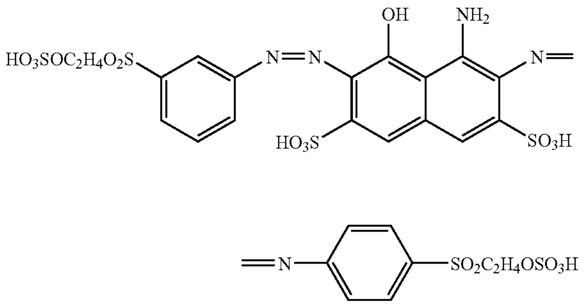

and a second dye which is a member selected from the group consisting of dyes having the formulae (b) and mixtures thereof:

(b)

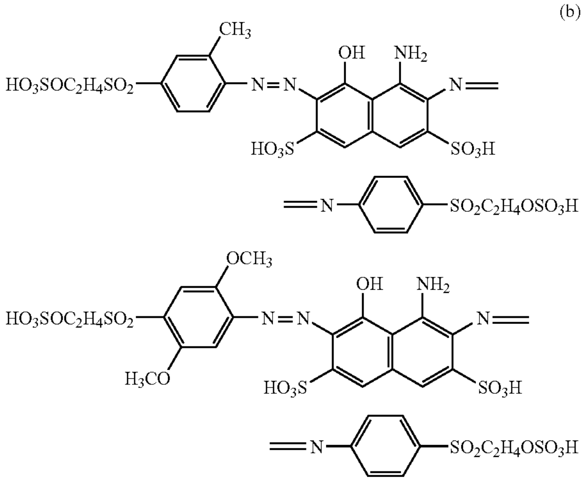

-continued

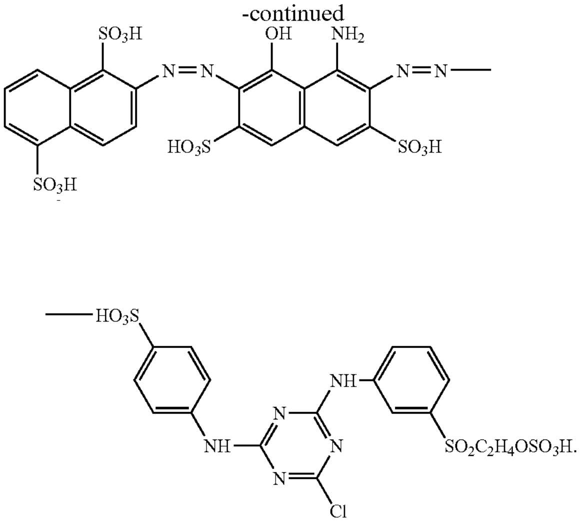

and a third dye (c) which is a member selected from the group consisting of dyes having the formulae (c) and mixtures thereof:

(c)

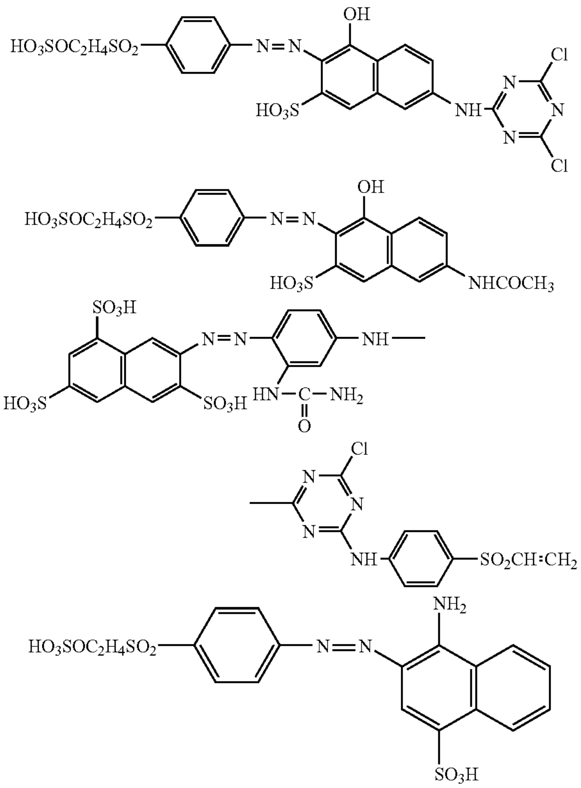

-continued

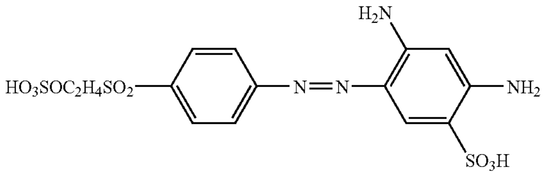

wherein the reactive dye component comprises 3% to 90% by weight of (a), at least 3% by weight of (b) and at least 3% by weight of (c), and wherein the composition is essentially free of zeolite builder.

2. A pouch according to claim 1, wherein upon contact with water the composition has an equilibrium pH of 11.0 or greater at a concentration of 4 g/l in de-ionized water and at a temperature of 20° C.

3. A pouch according to claim 1, wherein the composition comprises an alkalinity source selected from the group consisting of: sodium silicate, sodium meta-silicate; sodium carbonate and potassium carbonate; potassium hydroxide and sodium hydroxide; and mixtures thereof.

4. A pouch according to claim 1, wherein the second compartment comprises a source of carbonate in an amount of 10 wt % or greater.

5. A pouch according to claim 4, wherein the composition comprises from 30 wt % to 70 wt % sodium carbonate.

6. A pouch according to claim 1, wherein upon contact with water the composition has an equilibrium pH of 10.5 or greater at a concentration of 4 g/l in de-ionized water and at a temperature of 20° C.

7. A pouch according to claim 1, wherein the nonionic surfactant in the first compartment comprises a predominantly $C_{16}$ alkyl ethoxylated alcohol having an average degree of ethoxylation of from 3 to 7.

8. A pouch according to claim 1, wherein the composition comprises an alkyl polyglucoside.

9. A pouch according to claim 1, wherein the composition is essentially free of sodium sulphate.

10. A pouch according to claim 1, wherein the composition is essentially free of bleach.

11. A pouch according to claim 1, wherein the composition is essentially free of phosphate builder.

12. A pouch according to claim 1, wherein the composition is essentially free of sodium silicate.

13. A pouch according to claim 1, wherein, the composition comprises from 3 to 25 APU activity of protease, from 10 to 50 KNU activity of amylase and from 750 CEVU to 1,500 CEVU activity of cellulase.

* * * * *